Patented May 8, 1934

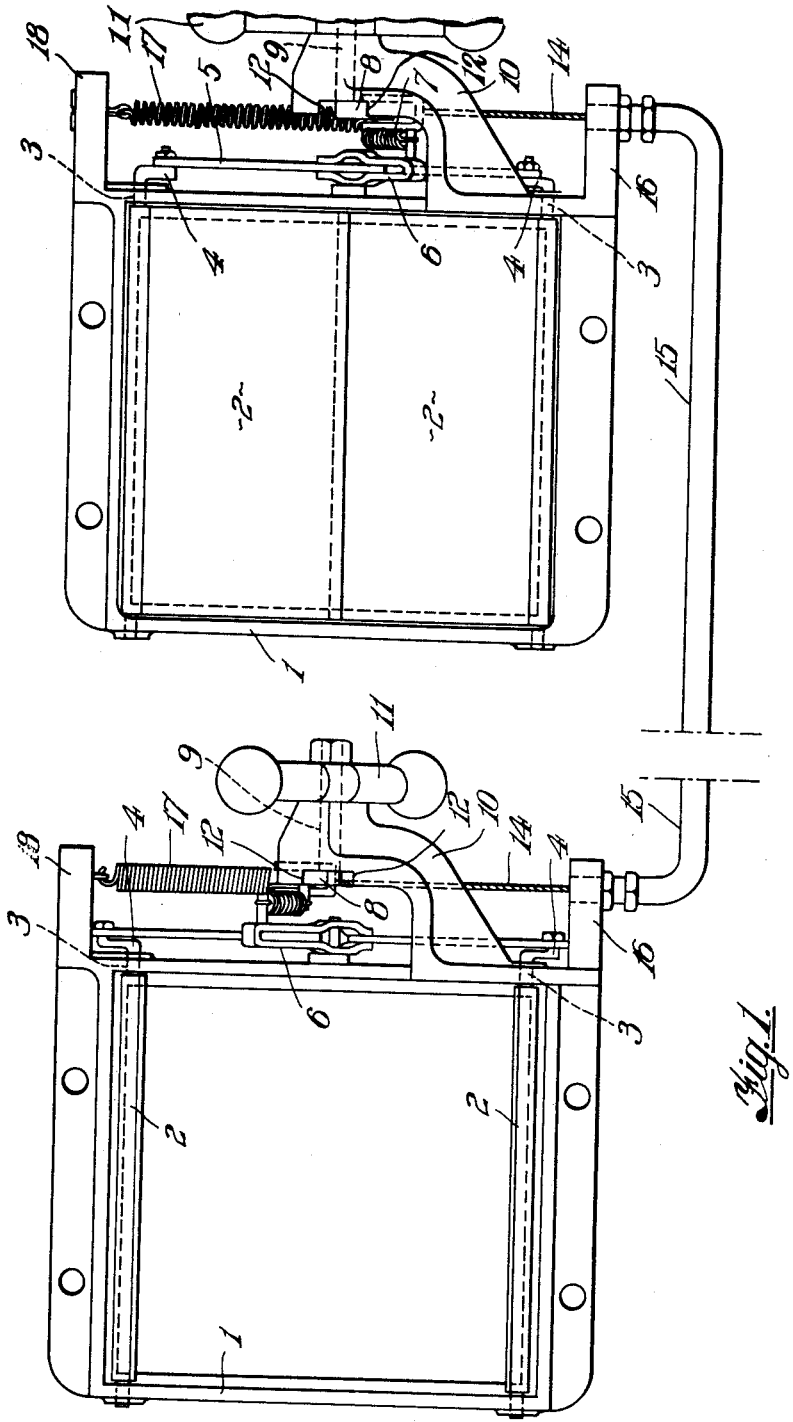

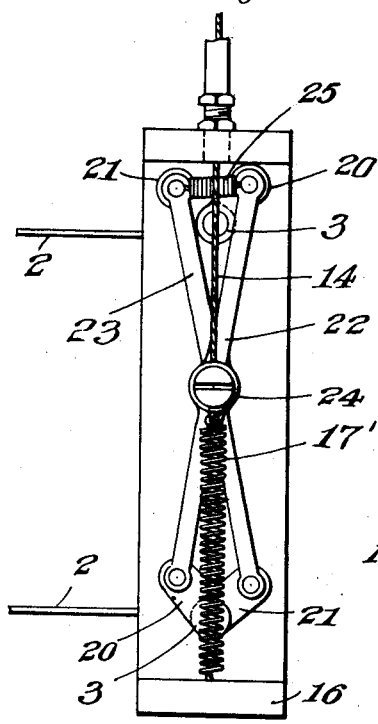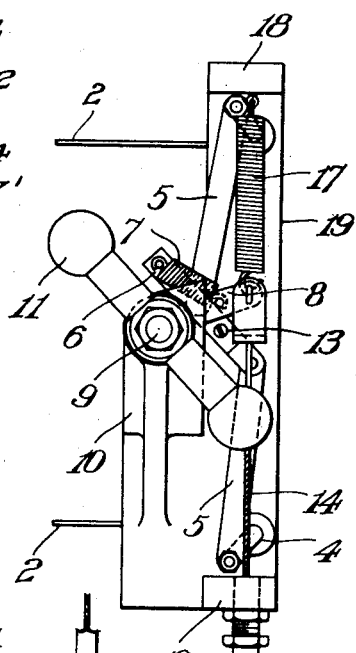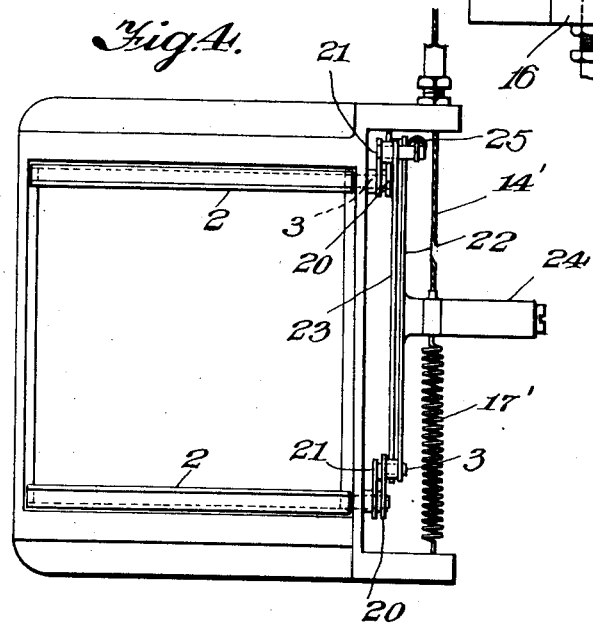

1,958,353

UNITED STATES PATENT OFFICE 1,958,353

MEANS FOR EFFECTING DISTANT CONTROL

John Leslie Stableford, London, England,

Application December 30, 1931, Serial No. 583,996
In Great Britain January 2, 1931

6 Claims. (Cl. 88—17)

This invention relates to means for effecting distant control of apparatus wherein it is desired to effect movement instantaneously with the movement of a device or mechanism actuated directly by an operator and the invention has for its object to provide improved non-electrical means for this purpose.

The invention has a particular application to cinematograph projection apparatus for ensuring simultaneous opening of the shutter of one projecting machine and closing of the shutter of another projecting machine when one reel mounted in one of such machines is exhausted and the succeeding reel mounted in the other of such machines is to be projected. By means of this invention the expense of installation and the uncertainty of operation of electrical synchronizing mechanism can be avoided.

It is also an object of the invention to provide an instantaneously operating device which, although actuated manually, is not dependent for its speed of operation on the speed of movement at which the manual operation takes place.

The invention consists in an arrangement for effecting instantaneous movement of an apparatus or device under distant control or of two remotely situated devices adapted to be operated the one from the other and includes means of an entirely mechanical character capable of actuation manually to transmit movement between two points by a flexible mechanical operated connection.

In carrying the invention into effect according to the preferred form and as applied to oppositely moving shutters for two cinematograph projection machines, each of the shutters is provided with a quick action operating mechanism, and a flexible mechanical connection is provided between the operating mechanism and one or more manual control elements in such a way that movement of the manual control elements or any one of them in a direction to open one of the shutters causes simultaneous closing of the other shutter.

Reference will now be made to the accompanying drawings in which:—

Figure 1 is a front elevation of a pair of oppositely moving shutters fitted with control mechanism embodying the present invention;

Figure 2 is a side elevation of one of the shutters shown in Fig. 1;

Figure 3 is a side elevation of one of the shutters equipped with a slightly modified form of control mechanism, and Figure 4 is a front elevation of the shutter and modified form of control mechanism shown in Fig. 3.

As shown in the drawings, each of the two shutters comprises a rectangular frame 1 and a pair of rectangular shutter plates 2 which are hinged at the upper and lower edges of the rectangular aperture provided by the frame 1 and are movable from the open position shown at the left hand side of Fig. 1 to a closed position in which the plates 2 completely close the aperture, as shown at the right hand side of Fig. 1.

Each of the shutter plates 2 is carried on a rock shaft which is journalled in the frame 1 and each of the rock shafts has one end projecting through one end of the frame 1 and carrying a short lever arm 4 by which the shaft is rocked to effect the opening and closing movements of the shutter.

Each of the lever arms 4 is connected by a link 5 to a pivoted lever 6 which is fulcrumed between its ends on the frame approximately mid-way between the shafts 3, the arrangement being such that movement of the lever 6 in one direction closes the shutter plates 2, whilst movement of the lever 6 in the opposite direction opens them.

One end of the lever 6 is connected by a spring 7 to a lever 8 carried on a rock shaft 9 which is journalled in a bracket 10 carried by the frame 1 and which may be manually rocked by a handle 11 also carried thereby.

The rocking movement of the lever 8 is limited by abutments 12 formed on the bracket 10 and the lever 8 is so mounted relatively to the lever 6 that, as it moves from one extreme position to the other, it passes through an intermediate position in which the connection between the spring 7 and the lever 8 is approximately aligned with the fulcrum 13 of the lever 6. By this arrangement a quick action of the shutters is obtained due to the action of the spring 7 when the connection between the spring 7 and the lever 6 crosses a line intersecting the ends of the spring 7 and the fulcrum of the latter lever.

In order to cause the shutters to operate simultaneously the hand control elements are connected together by a flexible mechanical connection. As shown in the drawings the flexible mechanical connection may be in the form of a Bowden cable 14, the two ends of the cable 14 being connected to the levers 8, whilst the two ends of the sheath 15, through which the cable 14 extends, are adjustably secured to brackets 16 formed on the frames 1.

Each of the levers 8 is also connected to one end of a tension spring 17, whose other end is connected to a bracket 18 formed on the frame 1, the purpose of the springs 17 being to tension the cable 14 and to permit the cable to transmit movement to the levers 8 in either direction.

The frames 1 are fitted with screw holes or other means of attachment to the projectors with which the device is used.

In operation, either of the shutters can be opened or closed by a partial rotation in the appropriate direction of the lever 8 associated therewith, and owing to the Bowden cable connection between the levers 8, movement of either of the handles 11 in a direction to close on shutter moves the other handle in a direction to open the other shutter and vice versa, so that the shutters are always oppositely moved.

As either of the levers 8 moves in the direction to open or close the corresponding shutter, the spring 7 is stretched and, when the point of connection thereof with the associated shutter actuating lever 6 crosses a line which intersects the ends of said spring and the fulcrum of such lever 6, the latter lever is rocked in a direction to open or close the shutter associated therewith. As soon as the tension of the spring 7 becomes sufficient to overcome the initial resistance to movement of the shutter, the spring contracts and quickly closes or opens the shutter. In this way a quick opening or closing movement of the shutters is obtained which does not depend upon the speed of movement of the hand lever.

It will be seen that the flexible Bowden cable enables the two shutters to be mounted in any required positions within the limits set by the length of the cable. Moreover, although the ends of the Bowden sheath are shown as attached to lugs 16 at the lower ends of the frames 1, whilst the ends of the spring 17 are attached to the lugs 18 at the upper ends of the frames 1, the position of these elements could be reversed if required so as to enable the cable to lead to the upper ends instead of to the lower ends of the shutter frames, when this is more convenient.

As shown in the drawings each of the handles 11 is disposed at the right hand side of the shutter frame 1 with which it is associated as this is usually the most convenient position, but these handles could be made to stand at the left hand sides of the shutter frames if required. This may be effected by fixing the shutter frames in the reverse position, that is to say, by rotating them through the angle of 180° in the plane of the shutters.

It will be noticed that the lever arms 4 carried by each frame 1 both project away from the back face 19 of each frame 1 so that the rock shafts 3 carry no parts which project towards that face. This enables the shutter plates 2 carried by each of the frames 1 to be placed close to the back face 19 of such frame, so that the shutter plates lie close to the wall, screen or other support to which the shutter frame is attached.

It is to be understood that the invention is not limited to the exact mechanical arrangement described for operating the shutters as this may be varied to a large extent without departing from the invention. For example, the members or plates 2 of each co-operating pair of shutters may be provided each with two links or arms 20 and 21 mounted on their pivots or shafts 3, these links or arms being connected by crossed levers 22 and 23, as shown in Figures 3 and 4, one of which levers is operated manually by longitudinal movement, the action being aided by a spring 25 connecting their outer ends. In this construction the Bowden wire 14' is connected to the point of manual operation, at which point a handle 24 is secured to the lever 22. The arms 21 are fixed to the shafts 3, and the arms 20 are loose on the shafts 3. The arms 21 of the shafts 3 of each cooperating pair of shutter plates are connected, respectively, to the opposite ends of the lever 23, and the arms 20 are connected, respectively, to the opposite ends of the lever 22 which crosses the lever 23. A spring 25, extending between the outer ends of the levers 20 and 21 associated with one of the shutter plates 2, tends to draw said ends together.

In the operation of this modified form of the invention, either of the shutters can be opened or closed by longitudinal movement, in the appropriate direction, of the lever 22 associated therewith, and owing to the Bowden cable connection between the levers 22 of the two shutters, movement of the handle 24 associated with either shutter in a direction to close such shutter will move the other handle in a direction to open the other shutter and vice versa, so that the shutters are always moved. When one of the levers 22 and 23 are pulled upwardly the arms 20 are rocked upwardly into the positions shown in Figure 3, the spring 25 will pull the arms 21 into the positions shown, thus moving the shutter plates 2 into the open position, as shown in said figure. When the lever 22 is moved downwardly, the arms 20 are rocked downwardly, thus placing the spring 25 under tension and, as soon as the arms 20 pass the dead centre position in relation to the arms 21, the tension of the spring 25 causes the arms 21 to rock downwardly, thereby moving the shutter plates 2 into closed position. Thus when the lever 22 is moved in a direction to open or close the shuter plates 2 the spring 25 is first placed under tension and, then when the dead centre position has been passed, quickly moves the shutter plates into closed position. Proper cooperation of two oppositely moving shutters is ensured by connecting the levers 22 of the two oppositely moving shutters by the Bowden cable 14' in such a way that movement of the handle 24 of one shutter in a direction to close the shutter plates 2 of same causes a movement of the handle 24 of the other shutter in a direction to open the shutter plates 2 of the latter. The springs 17' tension the Bowden cable 14' to permit said cable to transmit movement to the levers 22 in either direction.

The invention possesses the advantage that it can be assembled as a ready synchronized unit and applied to existing cinematograph projection machines, the provision for adjustment at the ends of the Bowden wire ensuring exact synchronism of operation after the device has been installed.

I claim:—

1. Operating means for moving the shutter of one cinematograph machine in one direction when the shutter of another cinematograph machine is moved in the opposite direction, said means comprising an actuating lever for the shutter of each machine, an operating lever fulcrumed adjacent each of said shutter-actuating levers to rock on an axis parallel to that of the latter, a spring extending between each of said operating levers and its associated shutter actuating lever, each of said springs being tensioned by the rocking movement of the operating lever to which it is connected and acting to rock the shutter actuating lever associated therewith when its end connected to such shutter-actuating lever crosses a line intersecting its ends and the fulcrum of such actuating lever, and means between said operating levers and operative when either of said operating levers is rocked in one direction to rock the other operating lever in the opposite direction.

2. Operating means for moving the shutter of the cinematograph machine in one direction when the shutter of another cinematograph machine is moved in the opposite direction, said means comprising an actuating lever for the shutter of each machine, an operating lever fulcrumed adjacent each of said shutter-actuating levers to rock on an axis parallel to that of the latter, a spring extending between each of said operating levers and its associated shutter actuating lever, each of said springs being tensioned by the rocking movement of the operating lever to which it is connected and acting to rock the shutter-actuating lever associated therewith when its end connected to such shutter-actuating lever crosses a line intersecting its ends and the fulcrum of such actuating lever, and flexible means connecting corresponding parts of said operating levers, said flexible connecting means being operative, when either of said operating levers is rocked in one direction, to rock the other operating lever in the opposite direction.

3. Operating means for moving the shutters of a pair of cinematograph machines in opposite directions according to claim 2 including means for maintaining the flexible means between the operating levers under tension.

4. Operating means for moving the shutter of the cinematograph machine in one direction when the shutter of another cinematograph machine is moved in the opposite direction, said means comprising an actuating lever for the shutter of each machine, an operating lever fulcrumed adjacent each of said shutter-actuating levers to rock on an axis parallel to that of the latter, a spring extending between each of said operating levers and its associated shutter actuating lever, each of said springs being tensioned by the rocking movement of the operating lever to which it is connected and acting to rock the shutter-actuating lever associated therewith when its end connected to such shutter-actuating lever crosses a line intersecting its ends and the fulcrum of such actuating lever, and a Bowden wire connecting corresponding parts of said operating levers, said Bowden wire being operative, when either of said operating levers is rocked in one direction, to rock the other of said levers in the opposite direction.

5. Operating means for moving the shutter of one cinematograph machine in one direction when the shutter of another cinematograph machine is moved in the opposite direction, said means comprising an actuating lever for the shutter of each machine, an operating lever fulcrumed adjacent each of said shutter-actuating levers to rock on an axis parallel to that of the latter, a spring extending between each of said operating levers and its associated shutter actuating lever, each of said springs being tensioned by the rocking movement of the operating lever to which it is connected and acting to rock the shutter-actuating lever associated therewith when its end connected to such shutter-actuating lever crosses a line intersecting its ends and the fulcrum of such actuating lever, a flexible member connected at its opposite ends to corresponding parts, respectively, of said operating levers, and a pair of springs connected, respectively, to the opposite ends of said flexible member and maintaining said flexible member under tension.

6. Operating means for moving the shutter of one cinematograph machine in one direction when the shutter of another cinematograph machine is moved in the opposite direction, said means comprising an actuating lever for the shutter of each machine, a spring connected to each actuating lever, an operating member connected to each spring and mounted for movement to shift the spring from an angular position at one side of the longitudinal center of the lever to an angular position at the opposite side of said center of the lever, each of said springs being tensioned by the rocking movement of the operating member to which it is connected and acting to rock the shutter actuating lever associated therewith when its end connected to such shutter-actuating lever crosses a line intersecting its ends and the fulcrum of such actuating lever, and means between said operating members and operative when either of said operating members is rocked in one direction to rock the other operating member in the opposite direction.

JOHN LESLIE STABLEFORD.